United States Patent [19]

Bergan et al.

[11] 4,219,165
[45] Aug. 26, 1980

[54] ATTACHMENT FOR FOOD CUTTERS

[75] Inventors: Norman A. Bergan, Dallas, Tex.;
Robert G. Walker, Augusta, Ga.;
Marvin Van Weelden, Plano, Tex.

[73] Assignee: Saladmaster, Inc., Dallas, Tex.

[21] Appl. No.: 950,087

[22] Filed: Oct. 10, 1978

[51] Int. Cl.² ............................................ A47J 43/25
[52] U.S. Cl. .................................. 241/93; 241/169.1;
241/285 R
[58] Field of Search ............. 241/93, 168, 169, 169.1,
241/273.3, 277, 285 R

[56] References Cited
U.S. PATENT DOCUMENTS

| | | | |
|---|---|---|---|
| 739,836 | 9/1903 | Cremer | 241/273.3 |
| 1,106,931 | 8/1914 | Donisi | 241/273.3 |
| 1,114,411 | 10/1914 | Stuver | 241/93 X |
| 2,596,604 | 5/1952 | Schaeffer | 241/93 X |
| 2,804,896 | 9/1957 | Silberberg | 241/273.3 |
| 3,635,270 | 1/1972 | Petroske et al. | 241/93 X |

Primary Examiner—Howard N. Goldberg
Attorney, Agent, or Firm—Richards, Harris & Medlock

[57] ABSTRACT

The specification discloses an attachment for a food cutting machine which facilitates perpendicular cutting and chopping of food. The attachment is designed for ready attachment to a conventional food cutter of the type having a rotatable cutting cone with cutting edges defined on the surface thereof and of the type also having a hopper disposed adjacent the cone for retaining and feeding food to the cutting edges thereof. The attachment, designed to position food approximately normally the cutting edges of the cone, includes a supporting surface adapted to be supported by the walls of the hopper and a bearing surface extending into the hopper short of the cone at an angle to the supporting surface. The attachment may also have structure for removably locking the attachment to the hopper including a ridge extending from the lower face of the supporting surface adapted to abut with the inside back wall of the hopper and a downwardly turned cylindrical lip extending from the edge of the supporting surface for engaging a flange extending from the back wall of the hopper. The abutting ridge and lip cooperate to prevent movement of the attachment relative to the hopper when food is pushed against the bearing surface of the attachment.

4 Claims, 3 Drawing Figures

U.S. Patent  Aug. 26, 1980  4,219,165
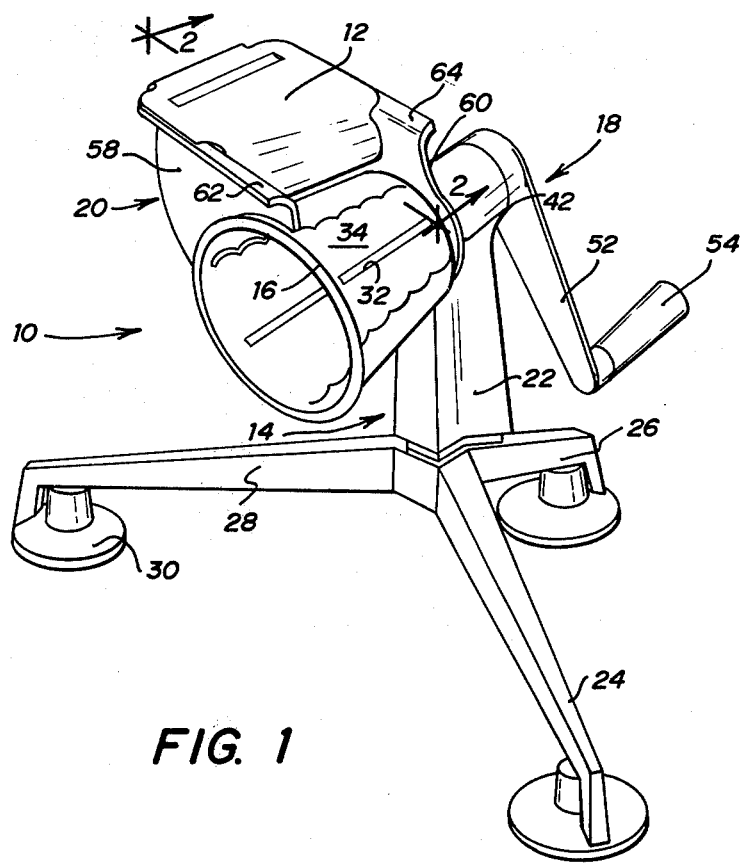
FIG. 1
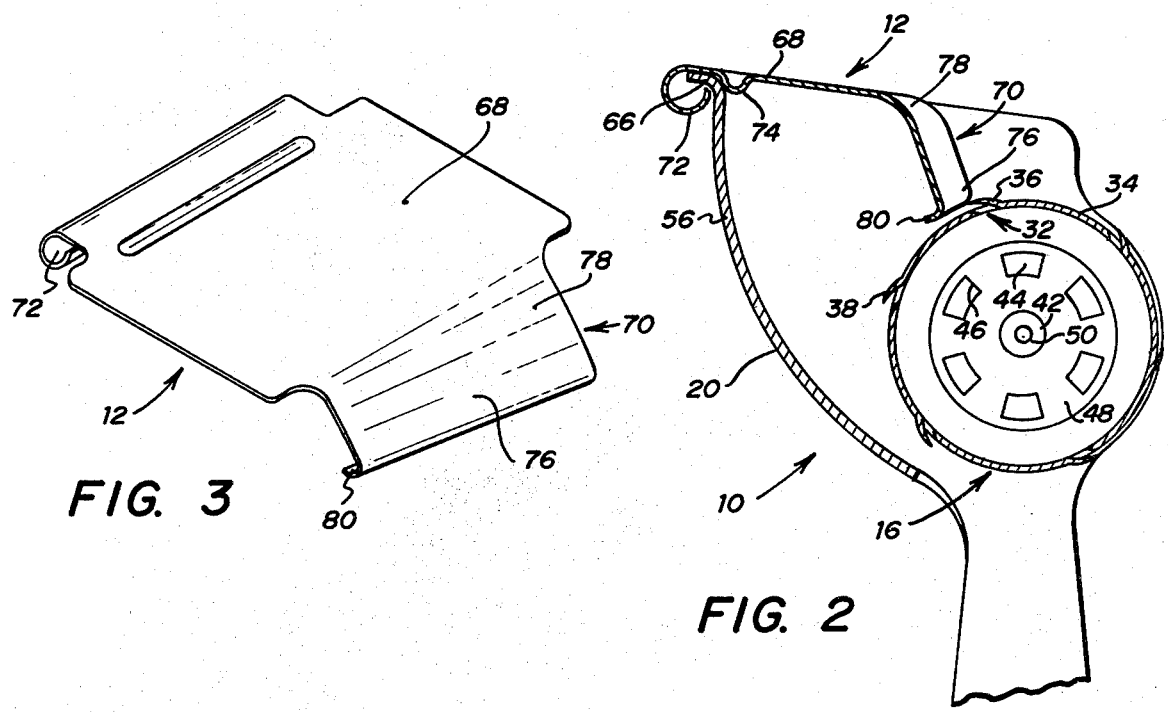
FIG. 3
FIG. 2

ATTACHMENT FOR FOOD CUTTERS

BACKGROUND OF THE INVENTION

1. Field of the Invention

This invention relates to food processing machinery and more particularly to food cutting machines and attachments.

2. Description of the Prior Art

In food cutting machines for kitchen use, fruits, vegetables and other foods are normally placed into a hopper and fed to a cutting cone which is rotated by a crank. Food cutting machines, such as those disclosed in U.S. Pat. No. Des. 201,602 issued July 6, 1965 for cutting fruits and vegetables are well known. Such devices are normally used for shredding, grating or slicing food, and therefore, the cutting edges of the cone are usually applied to the food at an angle to the surface thereof. It is also desirable to use conventional food cutting machines for other applications, such as for cutting and chopping food. Perpendicular cutting and chopping, however, is not ordinarily convenient with conventional food cutting devices because there is no provision for supporting the food normal to the cutting blade of the cone.

Accordingly, there is a need for a removable attachment for a conventional food cutter which may be quickly and easily attached to facilitate perpendicular cutting and chopping of food, and also readily removed to permit conventional operation.

SUMMARY OF THE INVENTION

The present invention is directed to a removable attachment for a food cutting machine which facilitates perpendicular cutting and chopping of food. The attachment is designed for ready attachment to a conventional food cutter of the type having a rotatable cutting cone with cutting edges defined on the surface thereof and also having a hopper disposed adjacent the cone for retaining and feeding food to the cutting edges thereof. The attachment, designed to position food approximately normally the cutting edges of the cone, includes a supporting surface adapted to be supported by the walls of the hopper and a bearing surface oriented at an angle to the supporting surface and extending into the hopper just short of the cone. The attachment may also include structure for removably locking the attachment to the hopper to prevent movement of the attachment relative to the hopper when food is pushed against the bearing surface of the attachment.

BRIEF DESCRIPTION OF THE DRAWINGS

FIG. 1 is a perspective view of a food cutter showing the attachment mounted to the hopper thereof;

FIG. 2 is a section view of the food cutter with attachment shown in FIG. 1 taken along the section line 2—2; and FIG. 3 is a perspective view of the present invention.

DESCRIPTION OF THE PREFERRED EMBODIMENT

FIG. 1 illustrates a conventional food cutting apparatus 10 with an improved attachment 12 mounted thereon. A food cutter 10 such as the model shown in FIG. 1 has a supporting structure 14, a revolving cutting cone 16, a crank 18 for rotating the cone and a hopper 20 which partially surrounds the cone as described hereafter in greater detail.

Supporting structure 14 may be an upstanding supporting arm 22 vertically supported by tripodal legs 24, 26 and 28 to which are mounted rubber or plastic feet 30 to enhance the stability of the legs on a flat surface such as a kitchen counter.

In a conventional food cutter, such as the model shown in FIG. 1, the cutting cone 16 contains a series of slits 32 cut in and parallel to the frustro-conical surface 34 through which sliced food falls into the interior of the cone as it is cut. The forward edge 36 of each slit 32 is bent so as to extend outside conical surface 34 and the exterior surface of edge 36 is beveled to form a cutting edge 38. The forward edge 36 may be corrugated to provide a unique cutting configuration and in practice a variety of different cones are available with a conventional food cutter to perform different slicing and shredding tasks.

Cutting cone 16 is removably mounted to a wheel 42 which has a series of stud members 44 disposed around the circumference thereof designed to fit into a series of apertures 46 in the circular base 48 of the cone. Wheel 42 is connected to an axle 50 pivotally mounted in supporting arm 22, connected at other side to crank 18, which consists of a moment arm 52 and a handle 54 extending perpendicular thereto. Rotation of crank 18 brings the cutting edges 38 to bear against the food held in the hopper.

Hopper 20, a three-sided structure, is formed of a continuously sloping back wall 56 and two perpendicular side walls 58 and 60. The hopper is thus open at the top and on the side facing cone 16. As best illustrated in FIG. 1, side walls 58 and 60 have semicircular contour, extending just up to and surrounding the cone.

In a conventional food cutter, back wall 56 and side walls 58 and 60 may each have a flange 62, 64 and 66, respectively, extending perpendicularly outwardly therefrom along the top of hopper 20, as best shown in FIG. 1. Flanges 62, 64 and 66 normally provide supporting structure for any of a variety of attachments provided for a conventional food cutter and may similarly be used in conjunction with the subject invention as set forth in greater detail below.

As best seen in FIG. 2, back wall 56 is a continuously sloping surface sloping from the vertical to a point tangent the cone at approximately the eight o'clock position. When attachment 12 is not in use, food placed in the hopper usually comes into contact with cutting edge 38 of the cone either tangent to the cone or at some angle thereto, the angle depending upon the size and shape of the food product being placed into the hopper.

While angular cutting is suitable for many applications, such as shredding and grating, it is often desirable to apply a cutting blade perpendicular to the food for cutting or chopping. The present invention makes processing in this mode possible by providing a bearing surface against which the food can be held approximately normal to the cutting edge 38.

Referring now to FIGS. 1—3, attachment 12 is shown as a unitary element having a planar supporting surface 68 with bearing surface 70 oriented at an angle thereto. In the preferred embodiment, the outside face of bearing surface 70 is disposed at an angle of about 300° with respect to the outside face of supporting surface 68. In operation, food products are placed in hopper 20 against the bearing surface 70 which at this angle positions the food approximately perpendicular to the cutting edges 38 of the cone.

Attachment 12 is removably mounted on the hopper 20 and may be mechanically locked thereto to prevent motion of the attachment relative to the hopper when food is pushed against bearing surface 70. The supporting surface 68 rests on flanges 62, 64 and 66 of the hopper. A locking machanism is provided on the supporting surface 68, consisting of a semicylindrical lip 72 extending from the rear edge thereof and a ridge 74 formed on the inside face of surface 68. The downwardly extending semicylindrical lip 72, shown in FIGS. 1 and 2, curves under supporting surface 68 but provides sufficient clearance for flange 66 to come between the edge of the lip and the inside face of surface 68. When positioned on hopper 20 in locked position, ridge 74 abuts against the inside of back wall 56. Lateral movement of the attachment relative to the hopper is thus prevented by lip 72 and ridge 74. Vertical movement of the attachment is also prevented by lip 72. The attachment 12 may be unlocked from hopper 20 and removed by first pivoting the attachment about flange 66 until ridge 74 clears back wall 56, then disengaging lip 72 from flange 66 by horizontal movement of the attachment from the hopper.

Although the lower portion 76 of the bearing surface should be substantially planar to position food approximately perpendicular to the cutting edges 38 of the cone, the upper portion 78 of bearing surface 70 may be continuously curved so that the bearing surface 70 slopes smoothly from supporting surface 68, thus making it easier to push food down into the hopper 20 against bearing surface 70. To prevent food from being jammed between the edge of the bearing surface and the cone, it may also be desirable to provide the bearing surface with an inwardly turned flange 80 as shown in FIG. 2.

The improved attachment disclosed herein is thus readily attachable to a conventional food cutter to expand the processing capability of such machines to perform cutting and chopping and other kinds of perpendicular cutting operations. It may also be quickly and simply removed to return the machine to normal operation.

Although particular embodiments of the invention have been described herein, it will be understood that the invention is not limited to the embodiments disclosed, but is capable of rearrangement, modification and substitution of parts and elements without departing from the spirit of the invention.

We claim:

1. In an apparatus for cutting food having a rotating cutting cone with cutting edges defined on the surface therof, a hopper having a back wall and two side walls substantially perpendicular thereto, the hopper disposed adjacent the cone for feeding food to the cutting edges thereof, an attachment removably mounted to the hopper for positioning food approximately normally the cutting edges of the cone comprising:
   a supporting surface for being supported by the back wall and side walls of the hopper;
   the supporting surface having a ridge formed on the inside face thereof capable of abutting against the back wall of the hopper to prevent movement of the attachment relative to the hopper; and
   a bearing surface oriented at an angle to the supporting surface and extending into the hopper just short of the cone.

2. The attachment of claim 1 wherein an edge of the supporting surface terminates in a downwardly turned semicylindrical lip for engaging the back wall of the hopper.

3. The attachment of claim 1 wherein the edge of said bearing surface short of the cone is turned inwardly away from the cone.

4. In an apparatus for cutting food having a rotatable cutting cone with cutting edges defined on the surface thereof, and a hopper defined by a sloping back wall and two side walls essentially perpendicular thereto, each of the walls having a flange extending perpendicularly outwardly at the top edge thereof, the hopper disposed adjacent the cone for feeding food to the cutting edges thereof, an attachment removably mounted to the hopper for feeding food approximately normally the cutting edges of the cone comprising:
   a supporting surface for being supported by the flanges of the back wall and side walls of the hopper, the supporting surface having a ridge formed on the inside face thereof positioned to abut with the inside back wall of the hopper, the edge of the supporting surface adjacent the back wall of the hopper terminating in a downwardly turned semicylindrical lip capable of engaging the flange extending from the back wall of the hopper;
   a bearing surface oriented at an angle to the supporting surface and extending into the hopper just short of the cone, the bearing surface being substantially planar along the lower portion thereof proximate the cone, the edge of the bearing surface short of the cone turned inwardly away from the cone; and
   the ridge and the lip cooperatively preventing movement of the attachment relative to the hopper when food is forced against the bearing surface thereof.

* * * * *